United States Patent

Wiswell, Jr.

[15] 3,673,407

[45] June 27, 1972

[54] RADIOGRAPHIC APPARATUS FOR UNDERWATER INSPECTION OF WOODEN PILINGS

[72] Inventor: George C. Wiswell, Jr., 1014 Pequot Road, Southport, Conn. 06490

[22] Filed: Feb. 19, 1969

[21] Appl. No.: 800,432

[52] U.S. Cl. .................................. 250/52, 250/53, 250/65
[51] Int. Cl. ........................................... H01j 37/20
[58] Field of Search ........................... 250/65, 53, 52

[56] References Cited

UNITED STATES PATENTS 3,136,892   6/1964   Willett .......................... 250/83.3 D Primary Examiner—James W. Lawrence
Assistant Examiner—D. C. Nelms
Attorney—Smythe & Moore

[57] ABSTRACT

An underwater apparatus employing radioactive material comprising a cylindrical chamber having a flexible end wall with the chamber being mounted against an underwater object through which the radiant energy rays are to be passed for radiographic purposes so that the flexible wall conforms to the surface of the object. A film pack is retained on the other side of the object opposite the flexible wall, and water is evacuated from the chamber. A source of radiation is positioned through a flexible conduit into the closed chamber opposite the flexible wall. The chamber has an inlet valve connected to a source of air under pressure and an exhaust valve.

3 Claims, 3 Drawing Figures

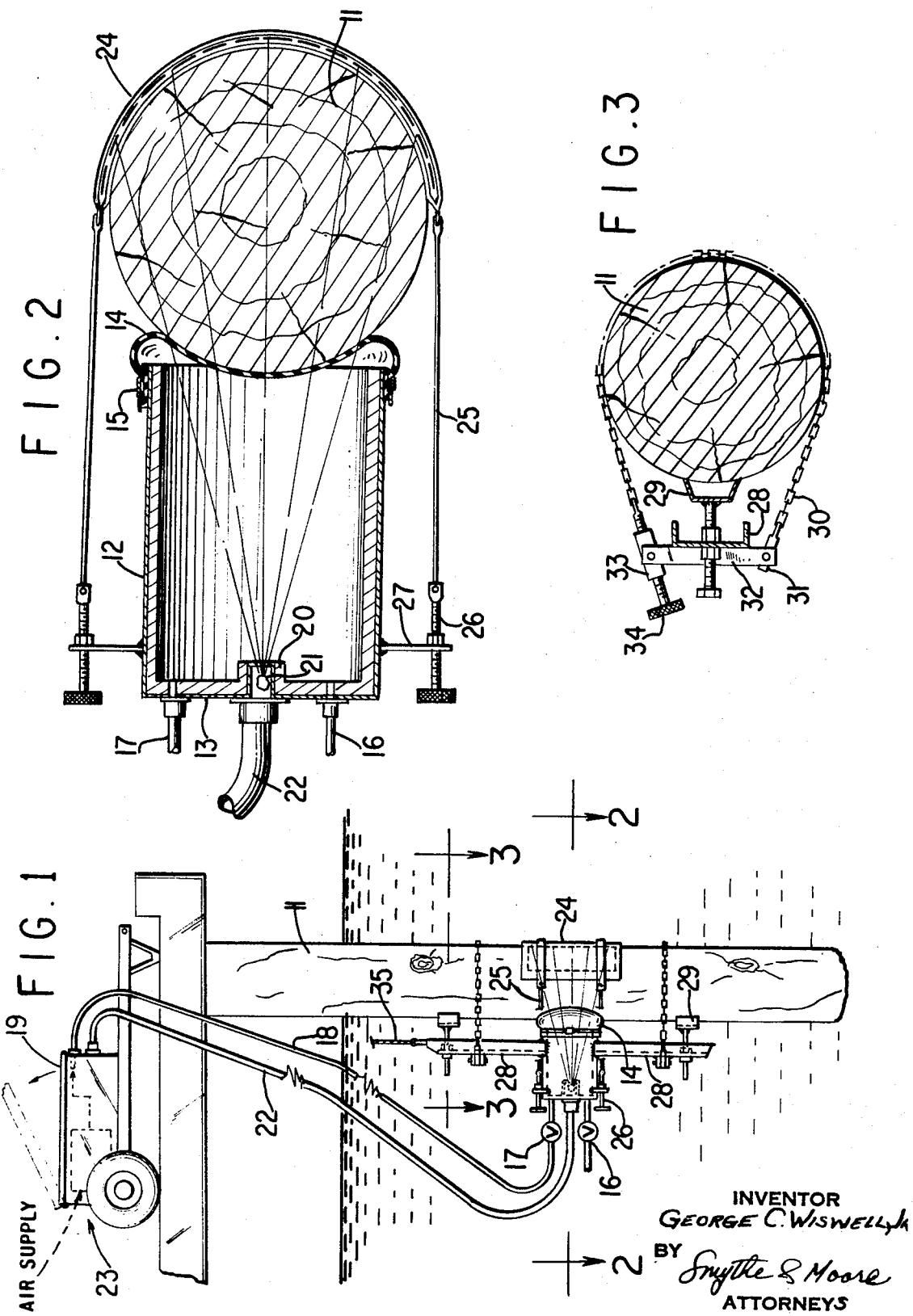

RADIOGRAPHIC APPARATUS FOR UNDERWATER INSPECTION OF WOODEN PILINGS

In order to conduct a proper inspection of underwater structures, it has long been desireable to make radiograms or radiant energy pictures of these structures to ascertain the presence of any defects and the general condition of the structure. This has been particularly true in the inspection of the underwater portions of wooden pilings. It is desirable to make radiographic pictures of wooden pilings in order to detect the presence of the marine borer in possibly infected piles. Suitable radiant energy equipment utilizing a cobalt source of radiation has been available for such an undertaking. Such equipment has not been completely satisfactory since the problem has existed of devising a simple and effective structure for positioning the source of radiation at a predetermined distance from the pile and then to evacuate the water from between the source of radiation and the pile so that the radiation can go through the air, through the pile, and then to a film pack positioned on the opposite side of the pile. The distance between the source of radiation and the surface of the pile is approximately 18 to 20 inches. While considerable effort has been expended toward devising a suitable arrangement for positioning the source of radiation with respect to a piling or other underwater structure, as far as it is known a satisfactory structure has not been devised up to the present date.

One of the objects of the present invention is to provide an improved underwater radiographic apparatus.

Another of the objects of the present invention is to provide an apparatus for positioning a source of radiation at a predetermined distance from an underwater object to be radiographed and evacuating the water from between the source of radiation and the object.

According to one aspect of the present invention, the underwater radiographic apparatus may comprise a closed cylindrical chamber with an end wall thereof being flexible. The closed chamber is provided with an exhaust valve and with an inlet valve with the latter being connected to a source of air under pressure. Means are provided within the chamber and communicating with the chamber for positioning a source of radiation in the chamber opposite the flexible wall so that the radiation passes from one end of the chamber to the other. The chamber is also provided with means for detachably mounting the chamber with its flexible wall against the underwater object. After the chamber is mounted in position, any water within the chamber is evacuated by introducing air into the chamber. The source of radiation may be positioned in the chamber through a flexible conduit communicating with the chamber and an above-water position.

It is to be understood that the radiant source or radiant energy may be any suitable type of such radiation, e.g. cobalt, neutron bombardment, x-ray, etc.

Other objects, advantages and features of the present invention will be apparent from the accompanying description and drawings, which are merely exemplary.

In the drawings:

FIG. 1 is a side elevational view showing the underwater radiographic apparatus according to the present invention positioned on an underwater piling;

FIG. 2 is a sectional view taken along the line 2—2 of FIG. 1 and showing the manner in which the film pack is held on the opposite side of the piling; and FIG. 3 is a sectional view taken along the line 3—3 of FIG. 1 showing the manner in which the chamber is mounted against the piling.

Proceeding next to the drawings wherein like reference symbols indicate the same parts throughout the various views, a specific embodiment of the present invention will be described in detail.

In FIG. 1 an underwater radiographic apparatus is indicated generally at 10 and is mounted on a wooden piling 11 which is to be radiographed. The apparatus comprises a closed cylindrical casing 12 of a rigid material, such as metal, with an end wall 13 and a flexible end wall 14. The flexible end wall 14 may be made of a suitable resilient material such as rubber or a rubber-like material and is attached to the outer surface of the cylindrical casing by a clamping band 15 or some other suitable structure. Flexible wall 14 bulges outwardly as shown in FIG. 2 so as to be able to conform closely to the surface of the object being radiographed.

On the end wall 13 of the casing there is provided an exhaust valve 16 and an inlet valve 17 which is connected through a flexible conduit 18 to an air compresser 19.

On the inner surface of end wall 13 there is formed a receptacle 20 for retaining a source of radiant energy 21 such as cobalt. While conventional sources of radiant energy may be employed, it is to be understood that this source of radiation may include other types of radiation such as gamma and other sources as well as a neutron bombardment.

A flexible conduit 22 communicates with the receptacle 20 and extends frOm the outer surface of end wall 13 to the operating unit indicated generally at 23 in which is also mounted the compressor 19. The source of radiation may be actuated from this operating unit.

A film pack unit is shown at 24 and comprises a flat envelope-like enclosure both ends of which may be attached by cables, wires or other suitable flexible elongated elements 25 to a tightening screw 26 threadedly carried in a bracket 27 welded to the outer surface of the closed chamber 12. As may be seen in FIG. 1, there may be upper and lower pairs of retaining wires 25.

In order to mount the closed casing against the piling 11 a pair of oppositely extending rod-like members 28 having a channel cross-section extend vertically upwardly and downwardly from the outer surface of the closed casing 12. Near the extreme ends of the rods 28, there are provided braces 29 which bear against the outer surface of the piling as shown in FIGS. 1 and 3. Inwardly of each of the braces 29 is a detachable element in the form of a flexible chain 30 which has one end secured at 31 to a cross bracket 32 and extends around the wooden piling to a threaded tightener 33. The tightener is provided with a knurled handle 34 for adjusting the force with which the chain 30 bears against the wooden piling. At the upper end of rod 28 there may be attached a cable 35 for raising and lowering the apparatus.

While not shown in the drawings, a second exhaust valve may be mounted on the upper-most surface of the cylindrical closed container as viewed in FIG. 1.

In the operation of the underwater radiographic apparatus, the closed chamber must first be positioned against the wooden piling which is to be radiographed in the manner as shown in the drawings. The size of the chamber is generally such that when inflated with air it would have too much bouyancy for a diver to manipulate the chamber under water into the proper position. To facilitate the positioning of the chamber, it is flooded with water by opening the exhaust valve 16 and a valve on the top of the chamber, if so provided. The air supply valve 17 at the same time is closed. In this manner the chamber may be flooded completely or the valves manipulated to keep a certain amount of air within the chamber to provide a desirable degree of bouyancy. The chamber is then manipulated into position and secured in position by encircling the chains about the wooden piling and tightening the chains by means of the tighteners.

Once the chamber is so positioned and clamped tightly into this position, the air supply valve is opened so that air may be introduced into the chamber and at the same time the exhaust valve 16 opened so that the water may be evacuated therefrom. As the closed chamber fills with air, the flexible wall will bulge outwardly into the position as shown in FIG. 2 and will be secured tightly against the surface of the wooden piling.

As soon as air starts to escape through the exhaust valve 16, the valve is closed and air continued into the chamber until the flexible wall is properly inflated and the air supply valve then closed. The film pack is then snapped into position and the radioactive source topside is so actuated that the source of radiation is transmitted through the chamber, the flexible wall, the wooden piling and against the film pack in a manner as indicated in FIG. 2.

After the photography process has been completed, the source of radiation may be retracted upwardly through the flexible conduit 22 and the film plate brought to the surface. Air can then be evacuated from the closed chamber and the chamber re-positioned for another photograph of a different portion of the wooden piling.

What is claimed is:

1. In an apparatus for the taking of radiographs of underwater pilings, a closed cylindrical chamber is rigid material having one end wall flexible, an inlet valve on the other end of said chamber, a source of air under pressure connected to said inlet valve, an outlet valve in said chamber for evacuating water from said chamber, said chamber being positioned radially of and with the flexible wall thereof engaging the exterior of said piling, flexible mounting means embracing said piling for mounting said chamber thereon, a source of radiation within said chamber opposite said flexible wall, a flexible conduit for permitting selective movement of said source of radiation between an above water position and said chamber, means for retaining a film pack on the side of said underwater piling opposite from said flexible wall, whereby a radiograph of said piling will be produced.

2. In an apparatus as claimed in claim 1 and comprising a second exhaust valve on the upper cylindrical surface of said closed chamber.

3. In an apparatus as claimed in claim 1 wherein said chamber mounting means comprises vertical rod means extending oppositely on the outer surface of said closed chamber, and detachable means on both said rod means for clamping around the piling.

* * * * *

UNITED STATES PATENT OFFICE
CERTIFICATE OF CORRECTION

Patent No. 3,673,407            Dated June 27, 1972

Inventor(s) George C. Wiswell, Jr.

It is certified that error appears in the above-identified patent and that said Letters Patent are hereby corrected as shown below:

Patent front page [56], insert:

```
2,412,174   12/1946   Rhoades.....................250/65
2,719,926   10/1955   Procter et al...............250/65
2,733,353    1/1956   Pirson......................250/65
3,214,586   10/1965   Graham......................250/53X
```

Column 3, line 13, "is" should be --of--.

Signed and sealed this 12th day of December 1972.

(SEAL)
Attest:

EDWARD M. FLETCHER, JR.            ROBERT GOTTSCHALK
Attesting Officer                   Commissioner of Patents